(12) United States Patent
Jang et al.

(10) Patent No.: US 7,799,303 B2
(45) Date of Patent: Sep. 21, 2010

(54) METHOD OF PREPARING SILICA NANOPARTICLES FROM SILICEOUS MUDSTONE

(75) Inventors: Hee-Dong Jang, Daejeon (KR);
Han-Kwon Chang, Daejeon (KR);
Ho-Sung Yoon, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 492 days.

(21) Appl. No.: 11/639,450

(22) Filed: Dec. 15, 2006

(65) Prior Publication Data
US 2008/0085232 A1   Apr. 10, 2008

(30) Foreign Application Priority Data
Oct. 9, 2006   (KR) ............... 10-2006-0098132

(51) Int. Cl.
C01B 33/12   (2006.01)
C01B 33/18   (2006.01)
(52) U.S. Cl. .................. 423/335; 423/336; 423/337; 977/773; 977/775; 977/776
(58) Field of Classification Search ......... 423/335–340; 977/773, 775, 776
See application file for complete search history.

(56) References Cited
U.S. PATENT DOCUMENTS

| | | | | |
|---|---|---|---|---|
| 5,165,905 | A * | 11/1992 | Sasaki et al. ............ | 423/325 |
| 5,445,804 | A * | 8/1995 | Iosef ....................... | 423/339 |
| 5,785,941 | A * | 7/1998 | Maginot et al. ........... | 423/337 |
| 2002/0102199 | A1 * | 8/2002 | Nishimine et al. ........ | 423/337 |
| 2004/0211730 | A1 | 10/2004 | Zang et al. | |
| 2005/0090634 | A1 | 4/2005 | Morse et al. | |
| 2006/0222582 | A1 * | 10/2006 | Shipley .................... | 423/335 |

OTHER PUBLICATIONS

Ki Do Kim, Kwan Young CHoi, Ji Won Yang, "Formation of spherical hollow silica particles from sodium silicate solution by ultrasonic spray pyrolysis method" Colloids and Surfaces A: Physicochem. Eng. Aspects 254 (2005), pp. 193-198.*

* cited by examiner

Primary Examiner—Timothy C Vanoy
Assistant Examiner—Diana J Liao
(74) Attorney, Agent, or Firm—Michael Best & Friedrich LLP

(57) ABSTRACT

There is provided a method of preparing silica ($SiO_2$) nanoparticles from siliceous mudstone which is silica mineral sources, using a chemical reaction. The method of preparing silica nanoparticles from siliceous mudstone comprises: solving a silica constituent into a sodium silicate aqueous solution by a sodium hydroxide leaching reaction of the siliceous mudstone (S100); performing ion exchange to remove a sodium constituent from the sodium silicate aqueous solution and to prepare a silicate aqueous solution (S200); and performing flame spray pyrolysis to prepare silica nanoparticles with an average particle dimension being in a range of 9 to 57 nm from the silicate aqueous solution. The present invention provides the method of preparing nanoparticles from siliceous mudstone by preparing the silicate aqueous solution from the siliceous mudstone by the chemical reaction and ion exchange process, and spraying the silicate aqueous solution being aerosolized and injecting generated liquid droplets of the solution into a flame reactor.

3 Claims, 4 Drawing Sheets

FIG. 4

Particle Collection

Cooling water

Particle Formation

Generation of Aerosol Precursor

Air → Precursor solution

METHOD OF PREPARING SILICA NANOPARTICLES FROM SILICEOUS MUDSTONE

CROSS-REFERENCE TO RELATED PATENT APPLICATION

This application claims the benefit of Korean Patent Application No. 10-2006-0098132, filed on Oct. 9, 2006, in the Korean Intellectual Property Office, the disclosure of which is incorporated herein in its entirety by reference.

BACKGROUND OF THE INVENTION

1. Field of the Invention

The present invention relates to a method of preparing silica nanoparticles, by solving a silica constituent from siliceous mudstone, which is amorphous silica mineral resources, into a sodium silicate aqueous solution by a leaching reaction of the siliceous mudstone; preparing a silicate aqueous solution, by removing a sodium constituent by ion exchange; and preparing silica nanoparticles with an average particle dimension being less than 100 nanometers (nm), by flame spray pyrolysis.

2. Description of the Related Art

Generally, a nanoparticle is defined as a particle with the dimension being 100 nm or less. Since nanoparticles have a high specific surface area per weight and novel functionality, these are widely used as advanced materials.

Silica nanoparticles are applicable, in various fields, as the filler for display and semiconductor encapsulants, i.e., epoxy molding compound (EMC), the filler of cosmetics and copy machine toners, the materials for improving the durability of paints and ink and inducing the irregular reflection thereof, and the materials for optical fibers, ceramics and glass industries. The known technologies for preparing silica nanoparticles are disclosed in U.S. Pat. No. 6,322,765B1 (entitled "Process for preparing silicon dioxide" and filed on Sep. 8, 1998), U.S. Pat. No. 6,698,247B2 (entitled "Method and feedstock for making silica by flame combustion" and filed on May 4, 2001), Korean Patent No. 10-0354432 (entitled "Method for forming spherical silica powder by aerosol pyrolysis" and filed on Jul. 12, 2000), and Korean Patent No. 10-0477200 (entitled "Method for manufacturing silica powder using ultrasonic aerosol pyrolysis" and filed on Jun. 5, 2002).

However, most of the relevant patents are focused on only a method of directly preparing silica nanoparticles, using silicon chloride and silicon alkoxide as a reactant. No patent discloses a comprehensive processing technology of preparing silica nanoparticles, by compounding sodium silicate from the siliceous mudstone which is mineral resources containing a silica constituent, preparing the silicate aqueous solution excluding a sodium constituent, and then preparing silica nanoparticles, using the silicate aqueous solution as a reactant.

SUMMARY OF THE INVENTION

The present invention provides a method of preparing silica nanoparticles, which provides a process technology for preparing the silica nanoparticles to be used in high-tech fields, from siliceous mudstone which is mineral resources as materials, and which uses a continuous processing technology of compounding sodium silicate from the siliceous mudstone which is the mineral sources containing a great quantity of a silica constituent, preparing a silicate aqueous solution excluding sodium, and then preparing silica nanoparticles.

According to an aspect of the present invention, there is provided a method of preparing silica nanoparticles, by solving a silica constituent into the form of sodium silicate by a leaching reaction of siliceous mudstone which is silica mineral resources; preparing a silicate aqueous solution by removing a sodium constituent by ion exchange; and then, preparing silica nanoparticles with an average particle dimension being 100 nanometers (nm) or less from the silicate aqueous solution by flame spray pyrolysis.

BRIEF DESCRIPTION OF THE DRAWINGS

The above and other features and advantages of the present invention will become more apparent by describing in detail exemplary embodiments thereof with reference to the attached drawings in which:

FIG. 4 is a schematic view of an apparatus for preparing silica nanoparticles in accordance with the present invention.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete, and will fully convey the scope of the invention to those skilled in the art.

In preparing silica nanoparticles from siliceous mudstone, an integrated process technology, comprising compounding sodium silicate; preparing a silicate aqueous solution; and preparing silica nanoparticles, will be described with reference to the drawings.

Figure 1:
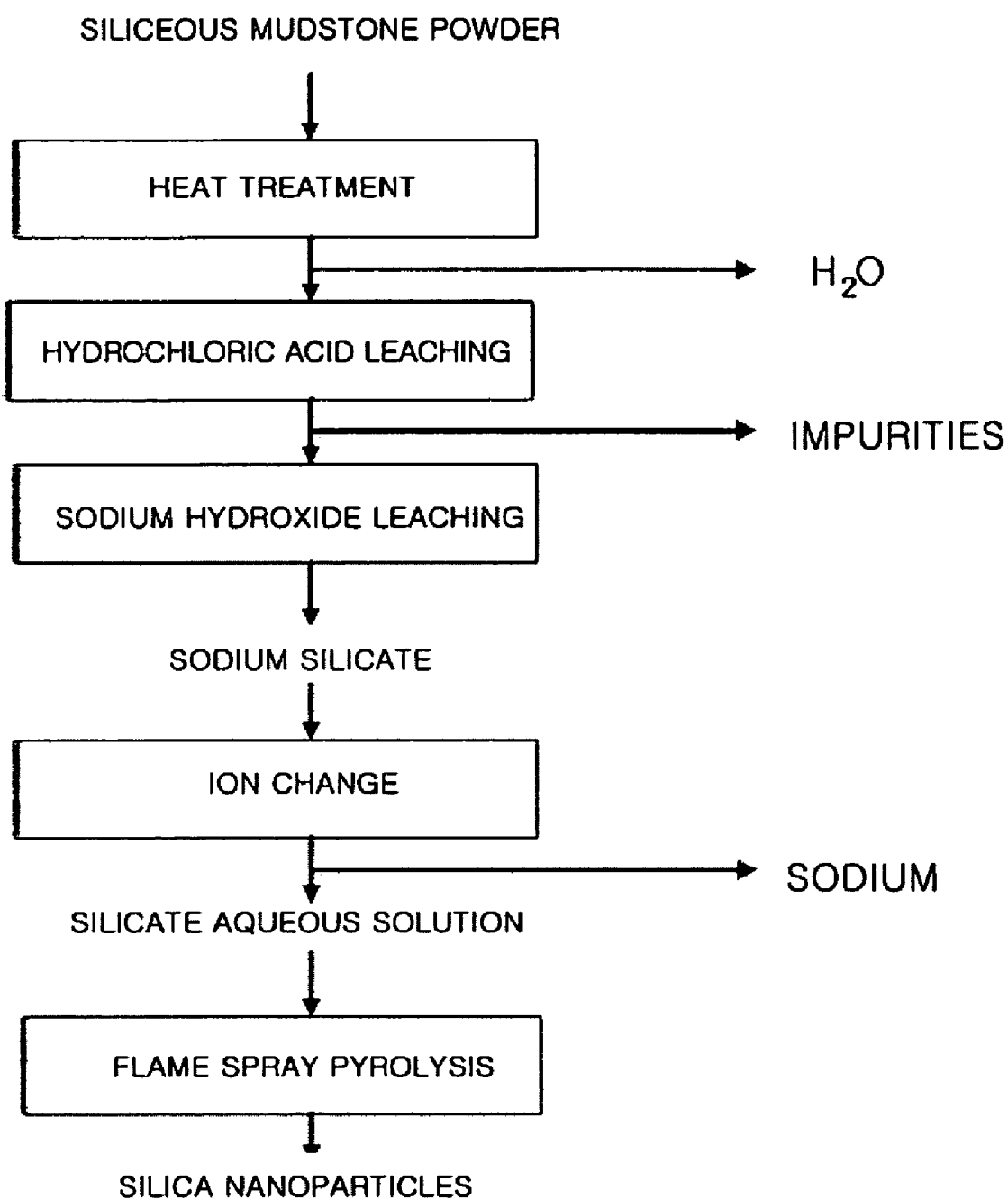
FIG. 1 is a flow chart of a method of preparing nanoparticles from siliceous mudstone, in accordance with an embodiment of the present invention.

FIG. 1 is a flow chart of the processes used for a method of preparing silica nanoparticles in accordance with an embodiment of the present invention. FIG. 1 illustrates the continuousness of processes comprising: removing impurities from the siliceous mudstone which is a raw material by a leaching reaction using hydrochloric acid; compounding sodium silicate by a leaching reaction using sodium hydroxide; preparing a silicate aqueous solution by removing sodium by ion exchange using cation resin; and preparing silica nanoparticles by flame spray pyrolysis.

Below, the aforementioned processes will be described in detail.

The method of preparing silica nanoparticles from siliceous mudstone comprises: solving a silica constituent into a sodium silicate constituent by a leaching reaction of the siliceous mudstone, using a sodium hydroxide aqueous solution (S100); performing ion exchange to remove a sodium constituent from the sodium silicate constituent, thereby preparing a silicate aqueous solution (S200); and performing flame spray pyrolysis to prepare silica nanoparticles with the average particle dimension being in within a range of 9 to 57 nanometers (nm) from the silicate aqueous solution (S300).

Prior to Step S100, the method of preparing silica nanoparticles further comprises: performing heat-treatment to remove a water constituent contained in the siliceous mudstone (S50); and performing a leaching action using hydrochloric acid to remove impurities contained in the siliceous mudstone (S60). At the solving of the silica constituent into sodium silicate at S100 after the impurities of the siliceous mudstone are removed at S60, as a reaction temperature increases from 25° C. to 100° C., extraction efficiency increases from 23% to 83%.

At the solving of the silica constituent into sodium silicate at S100, as a reaction time increases from 15 min. to 90 min. at a reaction temperature of 100° C., a leaching rate of the silica constituent increases.

At the performing of the ion exchange to remove the sodium constituent thereby preparing the silicate aqueous solution at S200, the ion exchange is an ion-exchange resin method using cation exchange resin, and the silicate aqueous solution is formed to contain the concentration of sodium being 50 ppm or less by passing an ion-exchange resin layer of a sodium silicate aqueous solution at a linear velocity of 2.0 to 0.5 cm/sec.

At the performing of the flame spray pyrolysis to prepare silica nanoparticles from the silicate aqueous solution by a flame reaction (S300), a flame reactor including five pipes is used, with a first tube through which the silicate aqueous solution, which is aerosolized by high-pressure spraying a dispersed air in a proportion of 1 to 3% by volume of a flow quantity of the whole gas, is injected; a second tube into which an argon gas flows by 7 to 8%; a third tube into which a hydrogen gas flows by 3 to 14%; a fourth tube into which an oxygen gas flows by 21 to 24%; and a fifth tube into which an air flows by 55 to 63%. As the pressure of the dispersed air, which is supplied for aerosolizing the reaction solution of the first tube, varies within a range of 0.5 to 2.0 kgf/cm$^2$, the average particle dimension of the silica nanoparticles is controlled.

Various embodiments of the present invention will be described as follows.

Exemplary Embodiment 1

Exemplary Embodiment 1 relates to the preparation of the sodium silicate aqueous solution as the first process for preparing silica nanoparticles from siliceous mudstone.

The siliceous mudstone used in the experiment is amorphous silica minerals. The siliceous mudstone includes the silica content of about 70% and a great quantity of organic matter and water in a natural state. When the siliceous mudstone is heat-treated at 800° C., the composition of a silica component increases to 90%, and aluminium and iron constituents as impurities are respectively present as 6.83% and 1.18% in the form of oxides.

For the experiment of a change in the leaching time, the siliceous mudstone is powdered to be in the average particle dimension of 9 micrometer (μm) and is leached to process the impurities, using a hydrochloric acid aqueous solution in the concentration of 110% of the required amount of hydrochloric acid, at a reaction temperature of 100° C. As a result, iron and aluminium are respectively removed as 75% and 55%. From the siliceous mudstone from which the impurities are removed, the sodium silicate aqueous solution is prepared through the leaching experiment using the sodium hydroxide aqueous solution. The reaction temperature and the reaction time are selected as main variables for the experiment. The reaction temperature is changed from 25 to 100° C., and the reaction time is changed from 15 to 90 minutes.

Figure 2:
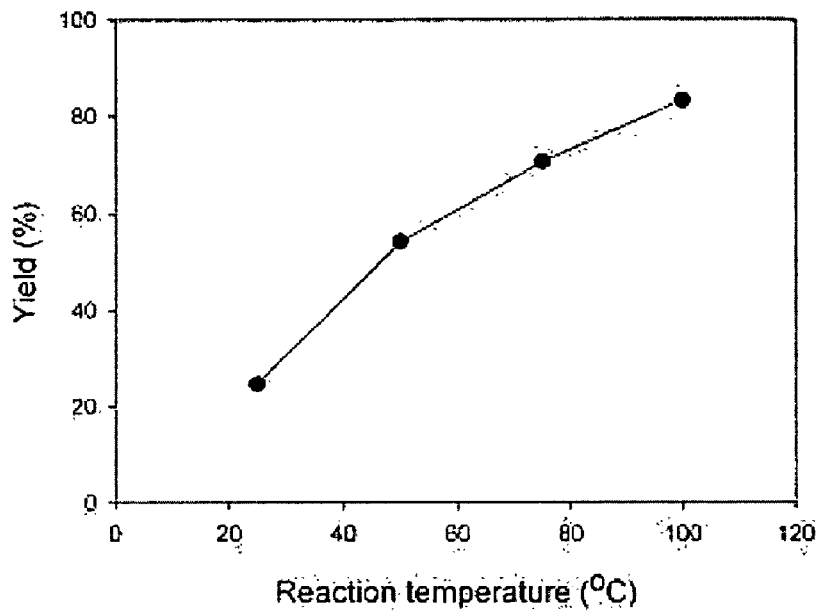
FIG. 2 is a graph illustrating that the leaching rate of a silica constituent increases as a reaction temperature increases in accordance with the present invention.

FIG. 2 illustrates the leaching rate of the silica constituent according to the change of the reaction temperature, under the condition that the reaction time is fixed as one hour. When the reaction temperature increases from 25° C. to 100° C., the extraction efficiency increases from 23% to 83%.

Figure 3:
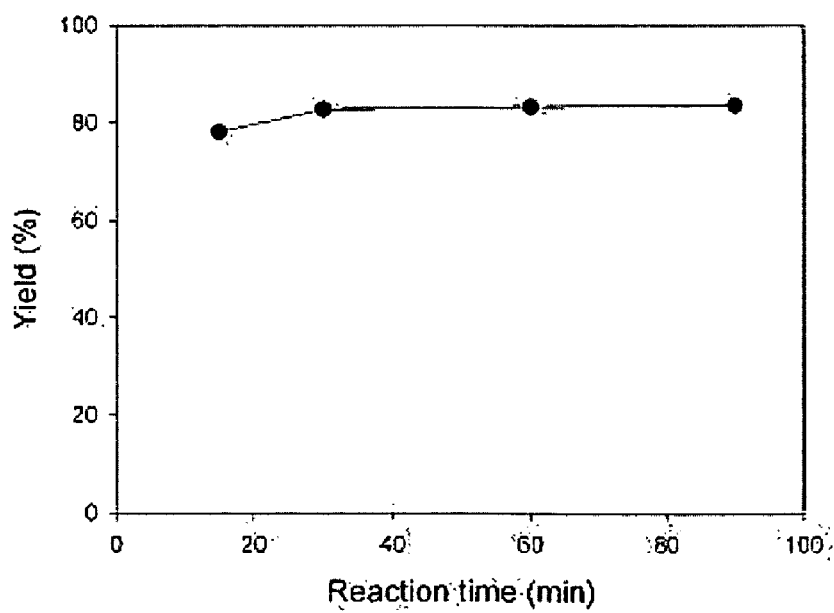
FIG. 3 is a graph illustrating that the leaching rate of the silica constituent increases as a reaction time increases in accordance with the present invention.

FIG. 3 illustrates the reaching rate of the silica constituent according to the change of the reaction time from 15 to 90 minutes, under the condition that the reaction temperature is fixed as 100° C. When the reaction time is more than 30 minutes, the extraction efficiency is consistent as 83%.

Exemplary Embodiment 2

Exemplary Embodiment 2 relates to the preparation of the silicate aqueous solution from the sodium silicate aqueous solution prepared during the first process, by removing the sodium constituent by the ion exchanging resin, as the second process for preparing silica nanoparticles from siliceous mudstone.

The ion-exchange resin relating to the adsorption of Na$^+$ by the cation exchange resin is described as the following formula:

$$\text{Resin--H}^+ + \text{Na}^+ + \text{SiO}^{32-} \rightarrow \text{Resin--Na}^+ + \text{H}^+ + \text{SiO}^{32-}$$

The cation exchange resin is in the form of hydrogen, and the pH range to be used is 0 to 14. An ion-exchange resin column is prepared with the capacity being 5 cm in diameter and 80 cm in height. The sodium silicate aqueous solution prepared in Exemplary Embodiment 1 is a strong alkali solution with the pH of about 14. As a result of passing the sodium silicate aqueous solution in the column, changing the linear velocity to 2.0, 1.5, 1.0, and 0.5 cm/sec, the amount of residual sodium in the silicate aqueous solution as processed decreases to 50, 30, 20 and 10 ppm, respectively.

Exemplary Embodiment 3

Exemplary Embodiment 3 relates to the preparation of silicate nanoparticles from the silicate aqueous solution prepared in Exemplary Embodiment 2, by flame spray pyrolysis, as the last process for preparing silica nanoparticles from siliceous mudstone.

The experiment of preparing silica nanoparticles is performed, by injecting the silicate aqueous solution into the flame formed under the following experimental conditions.

When the silicate aqueous solution is injected into an aerosol generator 10 in a dual fluid nozzle type as illustrated in FIG. 4, it is aerosolized, using a dispersed air at high pressure. Then, the aerosolized silicate aqueous solution is injected into a first tube 21 positioned at the centre of a burner 20. Argon, hydrogen, oxygen and air are sequentially injected into the diffusion type burner 20, through second, third, fourth and fifth tubes 22, 23, 24 and 25 respectively, thereby generating flame.

As for the flow quantity of gas flowing into the flame reactor including five tubes, the dispersed air is supplied to the first tube of the flame reactor, in a proportion of 2 to 3% by volume of the flow quantity of the whole gas, by changing its pressure to 0.5, 1.0, 1.4 and 2.0 kgf/cm$^2$, so that the silicate aqueous solution being aerosolized at a molarity of 0.843 mol/l is introduced; the argon gas by 7% is flowed into the second tube; the hydrogen gas by 14% is flowed into the third tube; the oxygen gas by 21% is flowed into the fourth tube; and the air by 55 to 56% is flowed into the fifth tube.

Figure 5:
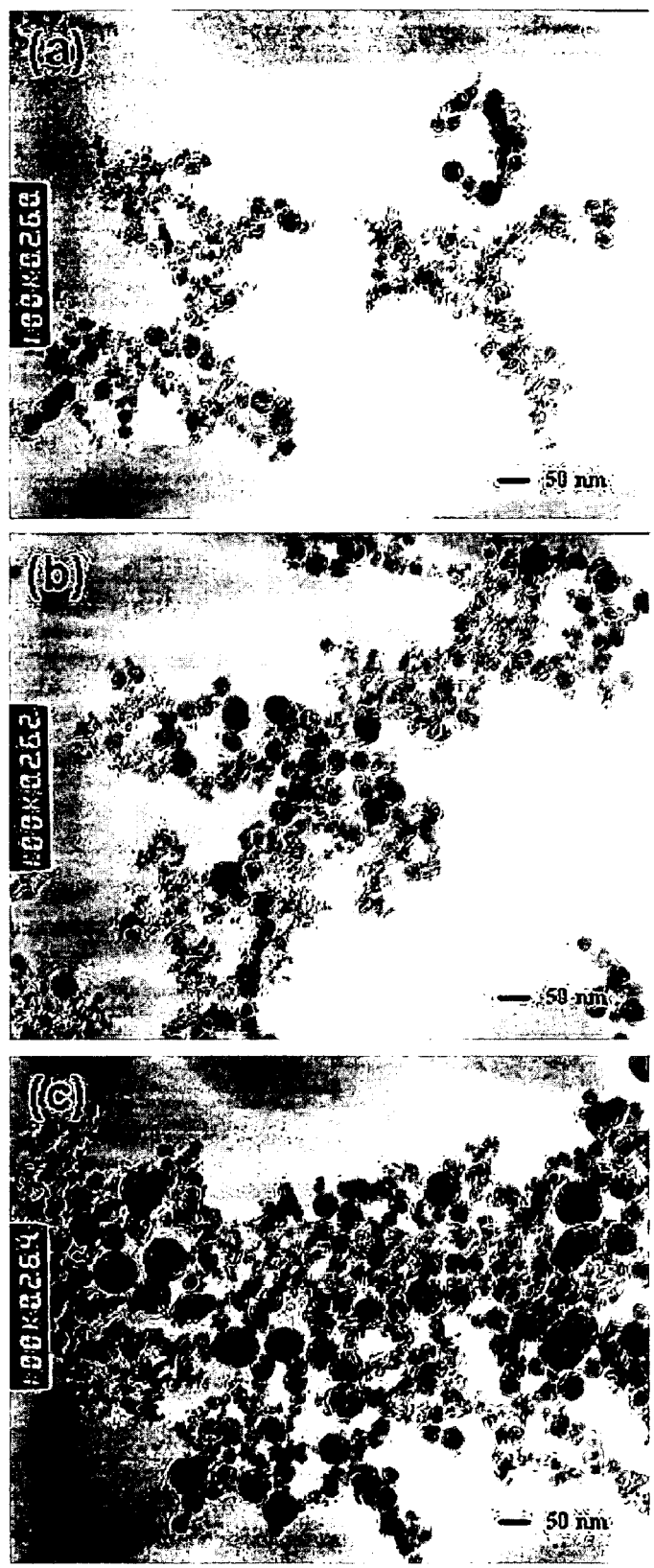
FIG. 5 is a picture by an electron microscope, illustrating the silica nanoparticles generated as the pressure of spraying a reactant changes in accordance with the present invention.

FIG. 5 is a picture by a transmission electron microscope (TEM), illustrating nanoparticles generated as the pressure of the dispersed air is changed to (a) 1.0 kgf/cm$^2$, (b) 1.4 kgf/cm$^2$, and (c) 2.0 kgf/cm$^2$ in the experiment of Exemplary Embodiment 3. It is noted that the particle shape is almost close to a spherical shape.

As a result of examining the changes in the specific surface area and dimension of a particle by the specific surface area analyzer (BET method), as the pressure of the dispersed air increases to 1.0 kgf/cm$^2$, 1.4 kgf/cm$^2$, and 2.0 kgf/cm$^2$, the specific surface area increases to 47 m$^2$/g, 174 m$^2$/g, and 294 m$^2$/g. In a conversion formula (dp=6/($\rho_p$·A), dp indicates the dimension of a particle, $\rho_p$ indicates the density of silica, and A indicates the specific surface area. From this formula, the average particle dimension as calculated decreases to 57 nm, 15 nm, and 9 nm.

In accordance of the present invention, the method of preparing silica nanoparticles from siliceous mudstone comprises solving the silica constituent into sodium silicate by 80% or more, by the leaching reaction of siliceous mudstone; preparing the silicate aqueous solution, by removing the sodium constituent to 50 ppm or less by ion exchange; and preparing the silica nanoparticles with the average particle dimension of 57 nm or less by flame spray pyrolysis.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of preparing silica nanoparticles from siliceous mudstone, comprising:

heat-treating siliceous mudstone to remove water;

leaching the sliceous mudstone with hydrochloric acid to remove impurities, thereby forming a silica constituent;

leaching the silica constituent with sodium hydroxide, thereby forming a sodium silicate aqueous solution;

passing the sodium silicate aqueous solution over an ion-exchange resin at a linear velocity of 2.0 to 0.5 cm/sec to remove a sodium constituent from the sodium silicate aqueous solution, thereby producing a silicate aqueous solution having a sodium concentration of 50 ppm or less;

flame spray pyrolyzing the silicate aqueous solution with a flame reactor to prepare nanoparticles from the silicate aqueous solution, the nanoparticles having an average particle dimension of 9 to 57 nm, and the flame reactor including five tubes:

a first tube through which the silicate aqueous solution, which is aerosolized by high-pressure spraying a dispersed air in a proportion of 1 to 3% by volume of a flow quantity of the whole gas, is injected, a second tube into which an argon gas flows by 7 to 8%, a third tube into which a hydrogen gas flows by 3 to 14%, a fourth tube into which an oxygen gas flows by 21 to 24%, and a fifth tube into which an air flows by 55 to 63%; and controlling the average particle dimension of the silica nanoparticles by varying the pressure of the dispersed air in the first tube from 0.5 to 2.0 kgf/cm$^2$.

2. The method of claim 1, wherein, the extraction efficiency of leaching the silica constituent with sodium hydroxide increases from 23% to 83% as the temperature increases from 25° C. to 100° C.

3. The method of claim 1, wherein, the rate of leaching the silica constituent with sodium hydroxide increases as the reaction time increases from 15 min to 90 min at a reaction temperature of 100° C.

* * * * *